(12) United States Patent
Adkisson

(10) Patent No.: US 7,543,173 B2
(45) Date of Patent: Jun. 2, 2009

(54) TIMESTAMP GENERATOR

(75) Inventor: Richard Adkisson, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 732 days.

(21) Appl. No.: 11/195,274

(22) Filed: Aug. 2, 2005

(65) Prior Publication Data

US 2007/0047458 A1    Mar. 1, 2007

(51) Int. Cl.
    G06F 1/04    (2006.01)
(52) U.S. Cl. ................. 713/502; 713/178; 713/501
(58) Field of Classification Search ......... 713/502, 713/178
    See application file for complete search history.

(56) References Cited

U.S. PATENT DOCUMENTS

| 3,906,346 | A  | * | 9/1975  | Hunter ................ 377/20 |
| 4,546,487 | A  | * | 10/1985 | Dackow ............... 377/51 |
| 4,764,863 | A  | * | 8/1988  | Silverthorn et al. ..... 714/39 |
| 5,226,153 | A  | * | 7/1993  | DeAngelis et al. ...... 714/45 |
| 5,471,631 | A  | * | 11/1995 | Beardsley et al. ...... 713/502 |
| 6,912,474 | B2 | * | 6/2005  | Richmond ............. 702/125 |
| 7,325,153 | B2 | * | 1/2008  | Terry ................. 713/501 |
| 2003/0063693 | A1 | * | 4/2003 | Heath ................. 375/343 |
| 2004/0187015 | A1 |   | 9/2004 | Geer et al. |

FOREIGN PATENT DOCUMENTS

EP    1179764 A3    2/2002
JP    2003125342 A    4/2003

* cited by examiner

Primary Examiner—Nitin C Patel

(57) ABSTRACT

A method of generating a timestamp includes measuring a time period between two events, automatically determining a precision for an indication of the time period, and storing the timestamp. The precision for the indication of the time period is decreased as the time period increases. The timestamp includes an indication of the precision and the indication of the time period, wherein the indication of the time period in the timestamp is stored according to the automatically determined precision.

11 Claims, 2 Drawing Sheets

TIMESTAMP GENERATOR

BACKGROUND

Electronic data is often timestamped as it is collected from a data source. For example, logic analyzers and data capture buffers may be used to analyze the operation and logic of electronic circuits to evaluate their performance or to detect bugs. Logic analyzers and data capture buffers monitor and record the activity of an electronic signal by periodically capturing the value of the signal and storing the value with a timestamp indicating when it was captured. A typical timestamp thus indicates the time period between samples in a data set, although timestamps may be used for other purposes. Because each data sample has a timestamp, using a large number of bits for the timestamps can quickly fill an undesirably large amount of storage space. If the data samples are small, meaning that they are stored in just a few bits, then using large, high precision static timestamps can fill much more space than the data samples themselves.

In systems having limited storage space, such as embedded logic analyzers, this problem is often addressed by requiring the user to predict the time period range for a data collection operation. If too small a range is selected, the timestamps overflow and alias to incorrect values. If too large a range is selected, the precision of the timestamps may be too low, reducing the available timing information.

SUMMARY

An exemplary method of generating a timestamp includes measuring a time period between two events, automatically determining a precision for an indication of the time period, and storing the timestamp. The precision for the indication of the time period is decreased as the time period increases. The timestamp includes an indication of the precision and the indication of the time period, wherein the indication of the time period in the timestamp is stored according to the automatically determined precision.

BRIEF DESCRIPTION OF THE DRAWINGS

Illustrative embodiments are shown in the accompanying drawings as described below.

DESCRIPTION

The drawings and description, in general, disclose a method and apparatus for generating a timestamp. The timestamp may be used for any suitable purpose, such as stamping data samples with a capture time or interval. One exemplary application is in a logic analyzer, informing the user of time intervals between data samples as precisely as possible, without requiring the user to predict the time interval or desired precision in advance. An exemplary embodiment of the method and apparatus generates a timestamp having a predetermined number of bits and including a count field and a range field. The count indicates the time interval since the timer was started and the range indicates the precision at which the count is stored. The range is dynamically adjusted, starting with a high precision that is decreased as the time period increases. This accommodates potentially large time ranges without overflowing the timestamp, while keeping the best precision possible based on the size of the timestamp and the time period. This is particularly beneficial to systems with limited storage space, such as an embedded logic analyzer, in which timestamps must use a small number of bits.

The time interval measured in clock cycles may be calculated as Time=Count*2^(Range*N) clocks, where Count is the value stored in the count field of the timestamp, Range is the value stored in the range field of the timestamp, and N is the number of bits in the count field of the timestamp. This may be translated into real time by multiplying the result by the clock period. Because the timestamp generator measures time in digital fashion and stores the count field of the timestamp with an automatically determined precision, the time indicated by the timestamp is not an exact indication of when the timestamp was generated. The uncertainty in the time due to the precision at which the count field was stored may be calculated as 2^(Range*N)−1. The range of time in which the timestamp was generated lies between the minimum (min) time, calculated as Count*2^(Range*N), and the maximum (max) time, calculated as Count*2^(Range*N)+2^(Range*N)−1.

The exemplary method and apparatus for generating a timestamp includes a hold device so that when the largest time is reached, meaning that the largest possible range and count is reached, the timestamp holds so that the values do not roll over and alias to an incorrect time. Therefore, when the range and count fields of a timestamp are both at their maximum values, they have likely been held from rolling over and the max time of the timestamp range is infinite, meaning that the system may have continued to run with the timestamp held for as long as the user allowed.

Figure 1:
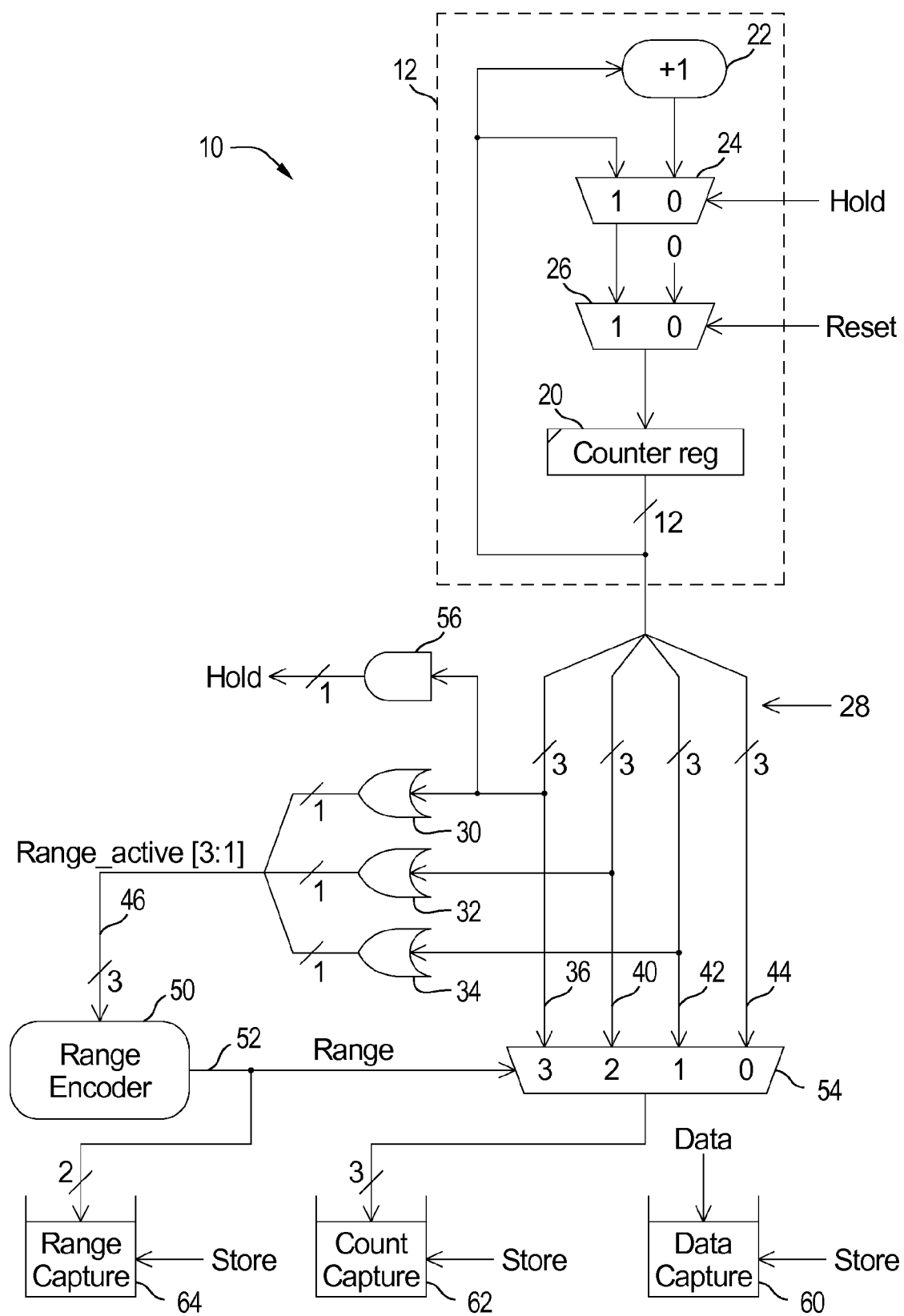
FIG. 1 is a block diagram of an exemplary circuit for generating a timestamp.

A block diagram of an exemplary circuit 10 for generating a timestamp is illustrated in FIG. 1. The circuit 10 may be adapted to generate a timestamp having any range of R bits and any count of N bits. The exemplary circuit 10 is adapted to generate a timestamp having a 2-bit range R and a 3-bit count N. The 2-bit range R stores binary range values to represent four ranges, 0 (00), 1 (01), 2 (10) and 3 (11). The 3-bit count N also stores binary count values to store a count of between 0 (000) and 7 (111). As stated above, the uncertainty of the time represented by the count field in the timestamp may be calculated as 2^(Range*N)−1. Note that as the uncertainty increases, the precision of the timestamp decreases. In range 0, the timestamp can represent a period in the range between 0 (min) and 7 (max) clock cycles, and the uncertainty is 2^(0*3)−1 or 0 clock cycles. In range 1, the timestamp can represent a period in the range between 8 and 63 clock cycles with an uncertainty of 7 clock cycles. (Note that the count field of the exemplary timestamp will not have a zero count with a non-zero range.) In range 2, the count can represent between 64 and 511 clock cycles with an uncertainty of 63 clock cycles. In range 3, the count can represent between 512 and 3584 clock cycles with an uncertainty of 511 clock cycles. (As will be discussed below, the timestamp is held at the 3584 value in this exemplary embodiment to prevent it from rolling over and corrupting the results. Thus, the count in this highest range is limited to a maximum of 3584 rather than 4095.) At a clock frequency of 333 MHz, this timestamp could measure from 0 to 10.8 microseconds.

The timestamp measures time using a counter 12 that counts a clock signal. The clock signal may be externally provided by the system in which the timestamp generator is included, or may be provided inside the timestamp generator using any suitable clock source. The counter 12 may increment the count at any clock event, such as a rising edge. The exemplary counter 12 comprises a counter register 20 having a predetermined number of data bits to store an internal count of clock cycles. The counter register 20 has $N*2^R$ data bits. The output of the counter register 20 is connected in a feedback loop to the input of an adder 22. The adder 22 increments the count by one before it is fed back into the input of the counter register 20 to be stored at the next clock cycle.

The exemplary counter 12 also includes a hold multiplexer 24 in the feedback loop between the output of the adder 22 and the input of the counter register 20. The hold multiplexer 24 has two inputs, one connected to the output of the adder 22 and one connected to the output of the counter register 20. The output of the hold multiplexer 24 is connected to the input of the counter register 20. A control input of the hold multiplexer 24 is connected to a hold signal that is asserted when the timestamp generator 10 has reached the end of its maximum time period, as will be discussed in more detail below. When the hold signal is not asserted, the hold multiplexer 24 selects the input connected to the adder 22 output, and when the hold signal is asserted, the hold multiplexer 24 selects the input connected to the counter register 20 output. As a result, when the hold signal is not asserted, the adder 22 is included in the feedback loop and the counter register 20 is incremented each clock cycle. When the hold signal is asserted, the adder 22 is excluded from the feedback loop and the counter register 20 holds its value across multiple clock cycles. Note that the hold multiplexer 24 is illustrated and described in block diagram form, and each of the two inputs is $N*2^R$ bits wide to process the entire width of the counter register 20. The hold multiplexer 24 may be implemented in any suitable manner, such as with $N*2^R$ multiplexers, each with 2 1-bit inputs, or using AND gates.

The exemplary counter 12 also includes a reset multiplexer 26 in the feedback loop between the output of the adder 22 and the input of the counter register 20. The reset multiplexer 26 has two inputs, one connected to the output of the adder 22 (in this case, through the hold multiplexer 24 described above) and one connected to a signal carrying a reset value for the counter register 20. For example, the input carrying the reset value may be connected to a ground to represent a zero value. The output of the reset multiplexer 26 is connected to the input of the counter register 20. A control input of the reset multiplexer 26 is connected to a reset signal that is asserted between timestamp periods, such as when a data sample is collected and a timestamp is generated and stored. As a result, when the reset signal is not asserted, the input of the counter register 20 receives the count value, either incremented or not depending on the hold multiplexer 24. When the reset signal is asserted, the input of the counter register 20 receives a reset value such as zero to clear the counter register 20. As with the hold multiplexer 24, the reset multiplexer 26 is illustrated and described in block diagram form, and each of the two inputs is $N*2^R$ bits wide to process the entire width of the counter register 20. The reset multiplexer 26 may be implemented in any suitable manner, such as with $N*2^R$ multiplexers, each with 2 1-bit inputs.

The hold and reset multiplexers 24 and 26, if included in the counter 12, are used to clear the counter 12 after a store and have it increment until there is another store, thus reflecting the time between stores, or to hold the count when the counter 12 reaches some maximum value, thereby preventing an overflow. Note that the hold multiplexer 24 and reset multiplexer 26 may be placed in the feedback loop in any suitable location and order. In the exemplary counter 12, the adder 22 is included first in the feedback loop from the output of the counter register 20, followed by the hold multiplexer 24, and finally by the reset multiplexer 26. The adder 22 input is therefore directly connected to the counter register 20 output. One input of the hold multiplexer 24 is also directly connected to the counter register 20 output, and the other hold multiplexer 24 input is directly connected to the adder 22 output. One input of the reset multiplexer 26 is directly connected to the output of the hold multiplexer 24, and the output of the reset multiplexer 26 is directly connected to the counter register 20 input.

The counter 12 in the timestamp generator 10 is not limited to the exemplary embodiment described above. The counter 12 may alternatively be embodied in any suitable manner, such as using a commercially available counter in a packaged integrated circuit. The counter 12 may or may not include a reset and hold function as desired.

The counter 12 is very wide, having $N*2^R$ bits, and it would take an undesirable amount of storage space to store all $N*2^R$ bits in each timestamp. The output of the counter 12 is split into $2^R$ signals 28 of N bits each, referred to herein as count signals, only one of which is stored in the count field of the timestamp. A range is also stored in the timestamp in a range field, indicating which of the $2^R$ count signals from the counter 12 is stored as the count field. The range is determined by identifying the most significant of the $2^R$ count signals 28 having a non-zero value, if any. This may be done using $2^R-1$ OR gates 30, 32 and 34, one for each 36, 40 and 42 of the $2^R$ count signals 28 except the least significant 44. In this exemplary timestamp generator with a 2-bit range, three OR gates 30, 32 and 34 are used. All of the individual N bit lines in a count signal (e.g., 36) is combined in an OR gate (e.g., 30), resulting in an output signal that is asserted if that count signal (e.g., 36) has a non-zero value. The outputs from the $2^R-1$ OR gates 30, 32 and 34 form a $2^R-1$ bit range_active signal 46 that is processed by a range encoder 50. The range encoder 50 identifies the most significant asserted bit of the range_active signal 46 and produces an R-bit binary encoded range signal 52 carrying the number of the highest active range in the $2^R$ count signals from the counter 12. The range encoder 50 encodes the range signal 52 based on the range_active signal 46 according to the following truth table:

| range_active | | | range | |
|---|---|---|---|---|
| 3 | 2 | 1 | 1 | 0 |
| 1 | X | X | 1 | 1 |
| 0 | 1 | X | 1 | 0 |
| 0 | 0 | 1 | 0 | 1 |
| 0 | 0 | 0 | 0 | 0 |

For example, if the most significant count signal 36 is zero and the next most significant count signals 40 and 42 all have a non-zero count value, the range_active signal 46 will be 011 and the range signal 52 will be 10 binary, indicating range 2.

An output multiplexer 54 having $2^R$ inputs is used to select the most significant active count signal 28 based on the range signal 52. The count signals 28 are each connected to a unique input of the output multiplexer 54, and the range signal 52 is used as the control input to select one of the count signals 28. As with the hold and reset multiplexers 24 and 26, the output multiplexer 54 is illustrated and described in block diagram form, and each of the $2^R$ inputs is N bits wide to process the entire width of each of the count signals 28. The output multiplexer 54 may be implemented in any suitable manner, such as with N multiplexers, each with $2^R$ 1-bit inputs. In one alternative embodiment, the output multiplexer 54 may select an input based on the range_active signal 46 rather than the range signal 52.

The hold signal used to freeze the count in the counter 12 may be generated using an AND gate 56 to combine all of the individual bit lines in the most significant count signal 36. When all of the individual bit lines are asserted, the hold signal at the output of the AND gate 56 will be asserted to freeze the count.

During operation, the counter 12 in the exemplary timestamp generator 10 is cleared when the store signal is asserted, and the counter will begin to count clock cycles when the store signal is unasserted. When the store signal is again asserted, such as to store a data sample, the most significant active count signal 28 is stored in the count field 62 of the timestamp and the range signal 52 is stored in the range field 64 of the timestamp.

During a measuring period, the exemplary counter 12 begins at zero and the timestamp will be range=0, count=0 or time in clocks=0. When the counter 12 increments to 1, then range=0, count=1 and time=1. This will continue to counter=7, range=0, count=7 and time=7. When the counter 12 increments again, bit 3 of the counter 12 will be asserted and a new range will be selected so that range=1, count=1 and time=8. As the counter increments to 15 the lower bits are ignored and the range stays at 1, count stays at 1 and time stays at 8. Note that the time range is 8 to 15, because the uncertainty is 7 clock cycles as discussed above. When the counter 12 increments to 16, bit 4 is set so that range=1, count=2 and time=16 min and 23 max. As the counter 12 increments, the highest range is active when it contains one or more asserted bits. The counter 12 will hold when the counter is at 3584, or 111000000000 binary, and counter bits 11, 10 and 9 (the bits in the most significant count signal 36) are set. This will produce range=3, count=7 and time=3584 min clock cycles and infinity max.

In an alternative timestamp generator for a 10-bit timestamp having 2 range bits R and 8 count bits N, the uncertainty of the four ranges is 0, 255, 65535 and 16777215 clock cycles. The counter will hold at a clock count of 11111111000000000000000000000000 binary (eight 1's followed by 24 0's), or 4,278,190,080 decimal, a count value of 255 in the most significant count signal. At a clock frequency of 333 MHz this timestamp generator would measure time from 0 to just under 12.9 seconds.

Figure 2:
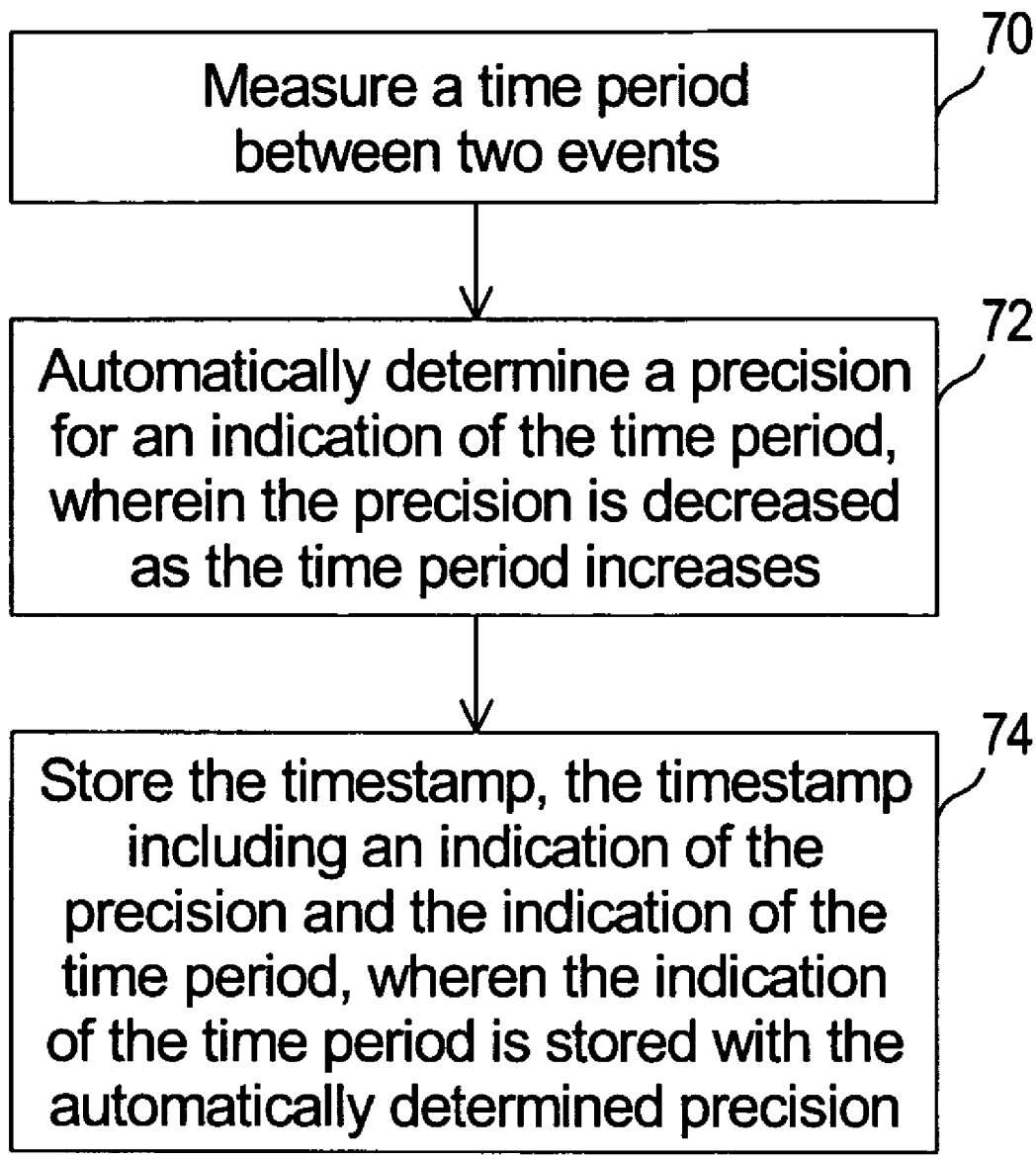
FIG. 2 is a flow chart illustrating an exemplary operation for generating a timestamp.

An exemplary operation for generating a timestamp is summarized in the flow chart of FIG. 2. A time period between two events is measured 70 and a precision for an indication of the time period is automatically determined 72, wherein the precision is decreased as the time period increases. In this exemplary embodiment, the precision is determined by selecting a range. The timestamp is stored 74, including an indication of the precision and an indication of the time period, wherein the indication of the time period is stored with the automatically determined precision.

The timestamp generator may be implemented in any suitable manner, such as in hardware in an integrated circuit, or using discrete logic gates, or in a gate array or application-specific integrated circuit (ASIC), etc, or in firmware or software code to be executed by a processor such as a microcontroller or microprocessor.

While illustrative embodiments have been described in detail herein, it is to be understood that the concepts disclosed herein may be otherwise variously embodied and employed, and that the appended claims are intended to be construed to include such variations, except as limited by the prior art.

What is claimed is:

1. An apparatus for generating a timestamp, comprising:
   a counter having an output, said output being split into a plurality of count signals, each of said plurality of count signals representing a portion of the contents of said counter;
   a multiplexer having a plurality of inputs and an output, each of said plurality of inputs connected to one of said plurality of count signals, said output providing a count portion of said timestamp; and
   a range encoder connected to at lease one of said plurality of count signals, said range encoder having an output providing a range portion of said timestamp, said range encoder output being connected to a control input of said multiplexer to connect one of said plurality of count signals to said multiplexer output.

2. The apparatus of claim 1, wherein said output of said counter is split by bit significance, so that one of said plurality of count signals contains a least significant portion of said contents of said counter and others of said plurality of count signals contain increasingly significant portions of said contents of said counter.

3. The apparatus of claim 1, said counter comprising a count register and an adder, wherein an output of said count register is connected to an input of said adder and an output of said adder is connected to an input of said count register.

4. The apparatus of claim 3, said count register further comprising a clock input, said count register being adapted to store a value at said input of said count register at a predetermined event in a clock signal at said clock input.

5. The apparatus of claim 3, said counter further comprising a hold multiplexer connected between said adder and said count register, one input of said hold multiplexer being connected to said adder output and another input of said hold multiplexer being connected to said counter register output, an output of said hold multiplexer being connected to said count register input.

6. The apparatus of claim 5, said hold multiplexer further comprising a control input, the apparatus further comprising an AND gate having a plurality of inputs, each of which is connected to an individual signal line in a most significant of said plurality of count signals, said AND gate having an output connected to said hold multiplexer control input.

7. The apparatus of claim 3, said counter further comprising a reset multiplexer connected between said adder and said count register, one input of said reset multiplexer being connected to said adder output and another input of said hold multiplexer being connected to a reset value for said count register, an output of said reset multiplexer being connected to said count register input, a control input of said reset multiplexer being connected to a store signal that is asserted when said timestamp is stored.

8. The apparatus of claim 1, further comprising at least one OR gate having a plurality of inputs, each of which is connected to an individual signal line in one of said plurality of count signals, and having an output connected to said range encoder.

9. The apparatus of claim 8, wherein said at lest one OR gate comprises one OR gate for each of said plurality of count signals except a least significant portion.

10. The apparatus of claim 1, wherein said range encoder is adapted to output a value indicating which of said plurality of count signals is most significant and has a non-zero value.

11. An apparatus for generating a timestamp having an R-bit range value and an N-bit count value, comprising:
    an $N*2^R$ bit counter having a clock input, a reset input, a hold input, and an output, said output being split into $2^R$ N-bit count signals, each of said $2^R$ N-bit count signals representing a portion of the contents of said counter;

a multiplexer having $2^R$ inputs and an output, each of said $2^R$ inputs connected to one of said $2^R$ N-bit count signals, said output providing said N-bit count value of said timestamp;

$2^R-1$ OR gates, one for all but a least significant of said $2^R$ N-bit count signals, each OR gate having N inputs connected to all individual signal lines in a corresponding one of said $2^R$ N-bit count signals;

an AND gate having N inputs connected to all individual signal lines in a most significant one of said $2^R$ N-bit count signals and an output connected to said counter hold input; and a range encoder having at least one input connected to an output of said $2^R-1$ OR gates, said range encoder having an output providing a range portion of said timestamp, said range encoder output being connected to a control input of said multiplexer to connect one of said $2^R$ N-bit count signals to said mulitplexer output, said range encoder being adapted to output said R-bit range value indicating which of said $2^R$ N-bit count signals is most significant and has a non-zero value.

* * * * *

UNITED STATES PATENT AND TRADEMARK OFFICE
CERTIFICATE OF CORRECTION

| | |
|---|---|
| PATENT NO. | : 7,543,173 B2 |
| APPLICATION NO. | : 11/195274 |
| DATED | : June 2, 2009 |
| INVENTOR(S) | : Richard Adkisson |

It is certified that error appears in the above-identified patent and that said Letters Patent is hereby corrected as shown below:

In column 6, line 11, in Claim 1, delete "lease" and insert -- least --, therefor.

In column 6, line 58, in Claim 9, delete "lest" and insert -- least --, therefor.

In column 8, line 6, in Claim 11, delete "mulitplexer" and insert -- multiplexer --, therefor.

Signed and Sealed this

Twenty-ninth Day of September, 2009

David J. Kappos
*Director of the United States Patent and Trademark Office*